United States Patent [19]

Simoleit et al.

[11] 4,203,953
[45] May 20, 1980

[54] PROCESS FOR REMOVING SO$_2$ FROM WASTE GASES

[75] Inventors: Hartmut Simoleit; Ludwig Walter, both of Hanover, Fed. Rep. of Germany

[73] Assignee: Kali-Chemie Aktiengesellschaft, Hanover, Fed. Rep. of Germany

[21] Appl. No.: 523,745

[22] Filed: Nov. 14, 1974

[30] Foreign Application Priority Data

Nov. 15, 1973 [DE] Fed. Rep. of Germany ....... 2356976

[51] Int. Cl.$^2$ ..................... C01B 17/00; C01B 17/02
[52] U.S. Cl. .................................... 423/243; 423/575
[58] Field of Search ............................ 423/242–244, 423/575

[56] References Cited

U.S. PATENT DOCUMENTS

| | | | |
|---|---|---|---|
| 1,936,959 | 11/1933 | Szombathy | 423/575 |
| 2,086,379 | 7/1937 | Clark | 423/243 |
| 2,729,543 | 1/1956 | Keller | 423/242 |
| 3,318,666 | 5/1967 | Every et al. | 423/575 |

FOREIGN PATENT DOCUMENTS 571862  2/1933  Fed. Rep. of Germany ........... 423/575

OTHER PUBLICATIONS

Albertson et al., Mechanism of the Reaction between H$_2$S and SO$_2$ in Liquid Media, JACS, vol. 65, 1690.

*Primary Examiner*—O. R. Vertiz
*Assistant Examiner*—Gregory A. Heller
*Attorney, Agent, or Firm*—Schwartz, Jeffery, Schwaab, Mack, Blumenthal & Koch

[57] ABSTRACT

A buffer solution containing glycerol is used for removing sulfur dioxide from waste gases. Sulfur is recovered from the glycerol-buffer solution having sulfur dioxide absorbed therein, by reaction with hydrogen sulfide.

14 Claims, No Drawings

PROCESS FOR REMOVING SO₂ FROM WASTE GASES

BACKGROUND OF THE INVENTION

(1) FIELD OF THE INVENTION

The present invention relates to a process of removing sulfur dioxide from waste gases and more particularly to a process of removing sulfur dioxide from waste gases by absorption, to a composition useful in removing such sulfur dioxide-containing waste gases, and to a process of recovering sulfur from said composition after its use.

(2) DESCRIPTION OF THE PRIOR ART

A number of processes for solving the problem of removing sulfur dioxide from waste gases which may contain, among other impurities, hydrogen sulfide in amounts up to 1% as well as oxygen, have been suggested heretofore. However, many of such processes cannot be used economically because they yield waste products which do not find any further use. An efficient process for recovering sulfur dioxide from waste gases must allow recirculation of the absorbent substantially without impairing its activity. Suitable absorbents are buffer systems. As is known, buffer systems represent equilibria which can be displaced towards absorption or, respectively, towards desorption when used for solving the present problem. In addition thereto and in accordance with their buffering action, their pH-value is only slightly changed when adding thereto or, respectively, removing therefrom an acid, i.e., in the present case, sulfur dioxide $SO_2.H_2O$. This property can be of considerable importance with respect to the suppression of side-reactions.

Thus a number of recently suggested absorption processes of removing sulfur dioxide from waste gases are based on the use of such buffer systems. For instance, German Published Application No. 2,208,102 discloses a process which is governed by the equilibrium

$$Na_2SO_3 + SO_2 + H_2O \rightleftarrows 2NaHSO_3 \qquad (1)$$

and is based by way of the equation

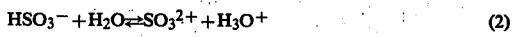

$$HSO_3^- + H_2O \rightleftarrows SO_3^{2-} + H_3O^+ \qquad (2)$$

on the buffer system

$$H_3O^+ = K \cdot [HSO_3'/SO_3''] \qquad (3)$$

The process disclosed in U.S. Pat. No. 2,031,802 is also based upon a buffer system because citric acid used therein is only partly neutralized by means of an alkali metal compound.

In German Published Application No. 2,250,959, there is described the use of the buffer system

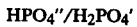

$$HPO_4''/H_2PO_4'$$

for the absorption of sulfur dioxide.

Regeneration of the absorption solution can be effected in various ways. When using the citrate process, the equilibrium is displaced by considerably increasing the temperature, i.e. by evaporation. In the two other processes described hereinabove, the sulfur dioxide is reacted to yield sulfur by introducing hydrogen sulfide into the absorption solution while increasing the temperature, if required.

All these processes have the disadvantage that they are not reversible to a satisfactory degree. A considerable amount of the absorbed sulfur dioxide is not desorbed nor converted into sulfur but it reacts with the formation of by-products such as the sulfate which cannot be recovered at all or which can be worked up to useful products only with difficulty and incompletely such as the thiosulfate or, respectively, the corresponding thionates.

The reason why such by-products are formed are manifold and can be indicated only briefly hereinafter. Formation of sulfate is mainly due to three facts. On the one hand the action of oxygen on sulfur dioxide causes oxidation, the speed of oxydation increasing when the pH-value increases from a pH of 2.0 to a pH of 6.0, the maximum speed of oxidation being observed at a pH of about 6.0.

Another cause of sulfate information is to be seen in the sulfite being disproportioned to sulfate and sulfur. Such disproportioning is favorably effected by a high sulfur dioxide concentration and high temperature. High sulfur dioxide concentration and high temperature, however, are conditions which are prevalent, for instance, at the beginning of the regeneration phase in the above mentioned buffer absorption solution.

A third possibility of sulfate formation consists in the reaction of pyrosulfite ($S_2O_5''$) with the information of dithionate and sulfate. This reaction takes place especially at low pH values, for instance, at a pH of 2.0 to 3.0, and at high sulfur dioxide concentrations, i.e. under conditions as they prevail at the end of the absorption phase if no special countermeasures are taken.

The above mentioned known processes, however, have further disadvantages. Thus, there are formed, especially in the presence of finely divided sulfur, polythionate (at a low pH-value) or thiosulfate (near the neutral point).

Another disadvantage of the known processes consists in the difference between the absorption temperature and the boiling point of the solution being relatively small. However, in order to achieve satisfactory regeration, a sufficient increase in temperature is essential so as to set free sufficient amounts of sulfur dioxide from the $HSO_3'$ ion which sulfur dioxide subsequently reacts further or, respectively, is desorbed.

SUMMARY OF THE INVENTION

It is one object of the present invention to provide a simple and highly effective process of removing sulfur dioxide from waste gases which process is substantially free of the disadvantages of the known processes.

Another object of the present invention is to provide a satisfactory and highly effective absorbent to be used for removing sulfur dioxide from waste gases.

A further object of the present invention is to provide a simple and effective process of recovering valuable by-products from the absorption solution.

Other objects of the present invention and advantageous features thereof will become apparent as the description proceeds.

In principle the process of recovering sulfur dioxide from waste gases according to the present invention comprises the use of an absorbent consisting of a buffer solution to which glycerol has been added. The use of such a buffer solution containing glycerol avoids all the above mentioned disadvantages of the heretofore known absorption processes. Surprisingly it was found that addition of glycerol to the buffer solutions keeps the degree of oxidation of said solution at a low level. As a result thereof formation of undesired oxygen-sulfur compounds such as thiosulfate, thionates, and sulfate is reduced to a minimum. As a result thereof it is even possible to purify waste gases with a high oxygen content, for instance, with an oxygen content up to about 25%, without the formation of a high proportion of by-products which can be further processed with difficulty only or not at all.

Furthermore, it was found that glycerol addition increases the buffering effect of the absorption solution to a noteworthy extent. Thus it is possible to charge the absorption solution with sulfur dioxide to a considerably higher extent than when operating according to the known processes. It is evident that the economy of the absorption process is considerably improved.

The boiling point of the absorption solution is increased by the addition of glycerol. Thus regeneration of this solution by means of hydrogen sulfide can be effected at a temperature above the melting point of sulfur. As a result thereof the sulfur formed can be withdrawn continuously from the reaction vessel in the form of liquefied sulfur. Furthermore, the yield of sulfur is larger when carrying out the reaction between sulfur dioxide and hydrogen sulfide at a higher temperature.

Glycerol addition to the buffer solution has also the further advantage that the resulting sulfur is obtained in the form in which it can readily be filtered when carrying out regeneration with hydrogen sulfide at a temperature below the boiling point of sulfur.

Certain terms as used in the following description of the present invention are defined hereinafter as follows:

(1) Buffer action:

$$W = -d[SO_2]/dpH \quad (4)$$

By buffer action there is understood the change in the sulfur dioxide concentration depending on the change in the pH-value, provided all other parameters are maintained constant. The buffer action may serve to compare two buffering agents.

(2) Sulfur dioxide charge or burden:

$$B = \frac{SO_2\text{-concentration [Mole/l.]} \cdot 100}{\text{Base concentration [Mole/l.]}} \quad [\%]$$

The charge or burden is related to the buffer action:

$$\Delta pH = -[\text{Base}]/W \cdot 100 \cdot \Delta B \quad (7)$$

It follows that the change in the pH-value is proportional to the change in the charge or burden.

(3) Break-through or escape value:

$$D = \frac{\begin{pmatrix}\text{amount of sulfur dioxide during}\\ \text{any period of time }\Delta t\text{ escaped}\end{pmatrix} \cdot 100}{\begin{pmatrix}\text{amount of sulfur dioxide introduced}\\ \text{into the absorption solution during}\\ \text{the same period of time}\end{pmatrix}} \quad [\%] \quad (8)$$

The break-through or escape value increases exponentially with the period of time during which the absorption solution remains in the absorbing vessel or, respectively, it increases exponentially with the charge or burden. Said value may serve to compare two absorption solutions with respect to their absorptive power.

(4) Degree of oxidation:

$$O = \pm \frac{[SO_4''] \text{ introduced} - [SO_4''] \text{ egressing} \cdot 100}{[\text{concentration of the oxidizable compounds}]} [\%] = \frac{\Delta[SO_4''] \cdot 100}{\begin{bmatrix}\text{concentration of the oxid-}\\ \text{izable compounds}\end{bmatrix}} [\%] \quad (9a)$$

$$O_{absorbed} = \frac{\Delta[SO_4'' \text{ in the absorber}] \cdot 100}{[SO_2] \text{ absorber exit}} [\%] \quad (9b)$$

The same equation applies accordingly to the regeneration phase if the sulfur dioxide is desorbed by heating.

$$O_{regenerated} = \frac{\Delta[SO_4'' \text{ in the regenerator}] \cdot 100}{[SO_2] \text{ regenerator entrance}} [\%] \quad (9c)$$

However, if the absorption solution is regenerated by reaction of the sulfur dioxide with hydrogen sulfide according to the equation $SO_2 + 2 H_2S \rightarrow 3 S + 2 H_2O$, the following equation is applied approximately $$O_{regenerated} = \frac{\Delta[SO_4'' \text{ in the regenerator}]}{3 [SO_2] \text{ regenerator entrance}} \cdot 100 [\%] \quad (9d)$$

The reason for this is that sulfur dioxide as well as hydrogen sulfide are accessible to oxidation to form $SO_4''$. In approximation there is to be taken into consideration only the amount of hydrogen sulfide which is in a stoichiometric proportion to sulfur dioxide.

The entire process is defined as follows:

$$O_{total} = \frac{\Delta[SO_4'' \text{ in the absorber}] + \Delta[SO_4'' \text{ in the regenerator}]}{3 [SO_2] \text{ absorbed}} \cdot 100 [\%] \quad (9e)$$

It is readily understood that the degree of oxidation is an essential characteristic for judging the effectiveness of a process and of measures for suppressing formation of sulfate.

(5) Yield of sulfur:

$$A_S = \frac{\text{amount of sulfur [Mole]} \cdot 100}{3(\text{absorbed amount of sulfur dioxide [Mole]})} [\%] \quad (10)$$

The yield of sulfur is an index for the reversibility of a process, provided neither sulfur dioxide, nor sulfur are lost in substantial amounts during regeneration.

The following demands are to be met by the entire system according to the present invention to render the process economical:

1.1 Low break-through or escape value or, respectively, low residual sulfur dioxide concentration of the gas leaving the absorption reactor ($\leq 50$ ppm).

1.2 High space-time yield in relation to the absorption, i.e. large amounts of absorbed sulfur dioxide/(m$^3$ volume of reactor·hour).

1.3 High space-time yield with respect to the regeneration, i.e. for the reaction of sulfur dioxide with hydrogen sulfide: high sulfur yield/(m$^3$·h).

It follows from the requirement 1.1 that the charge or burden of the solution must be as low as possible at the outlet of the gas from the absorption vessel (when carrying out absorption in a column in countercurrent procedure).

From the requirements 1.2 and 1.3 it follows that the solution is charged or burdened as high as possible at the entrance of the gas into the absorption space, i.e. the charge or burden must be about 30% to 32%.

It follows therefrom that countercurrent absorption offers the most favorable conditions for the charge or burden value.

2. Requirement to be met especially with regard to the buffer system.

These requirements are of general value and are mostly independent from the type of the buffering agent.

2.1 Low degree of oxidation during absorption and regeneration.

2.2 High buffering action. In this connection the individual properties of each buffering system used have the greatest effect (dissociation constant). A certain possibility of variation is given by the change in the proportion of the buffering components and their concentration.

2.3 High final charge or burden.

2.4 Low initial charge or burden. It follows therefrom according to equation (7) that as large as possible a pH-range to be utilized must be demanded. Since the lower pH-limit for the absorption is at a pH of about 2.5, and preferably of about 3.0, the pH-value of the solution before charging should be as high as possible, i.e. above a pH of 5.0 and, if possible, above a pH of 6.0.

2.5 In order to effect regeneration by means of hydrogen sulfide, it should be made possible to increase the temperature during regeneration as high as possible (at least by 20° C.) above the absorption temperature. Thereby side reactions are to be suppressed inspite of the increase in temperature.

The requirements mentioned hereinabove under 1 and 2 have only been met partly or not at all by the heretofore known processes. Thus, either the yield of sulfur is low due to the low charge, or the pH-value at the end of the absorption step is too low due to higher charge, namely is a pH $\leq$ 2.5. As a result thereof formation of polythionates and sulfate is favored or the degree of oxidation of sulfur dioxide is increased especially at high pH-values, namely at a pH between 5.5 and 7.0.

In contrast thereto the process according to the present invention meets all the above mentioned conditions to a very considerable extent.

As has been pointed out hereinabove, oxidation of sulfur dioxide is suppressed by the addition of glycerol to the aqueous buffering mixtures. Such oxidation is considerably more increased at a pH-range between 6.0 and 7.0 than, for instance, at a pH-range between 4.0 and 5.0. But an addition of only about 5%, by weight, of glycerol reduces to a measurable extent the degree of oxidation. Inhibition of oxidation increases with increasing glycerol concentration.

Glycerol addition thus enables to displace the useful pH-range to higher pH-values by suitable selection of the buffering agent, its composition and concentration, and thus reduces formation of by-products considerably. Said increased pH-range permits to increase the sulfur dioxide charge or burden in the absorption system of the present invention as has been mentioned hereinabove and, as a result thereof, improves considerably the economy of the process.

A further effect of the glycerol addition consists in increasing the pH-value of a buffer solution which has been charged with great amounts of sulfur dioxide, in comparison to an otherwise similar but solely aqueous buffer solution. This effect can be designated as an increase of the above defined buffer action W. By increasing the pH-value of a highly charged solution in this manner, the danger of thionate formation is considerably reduced as compared with a conventional solution the maximum charge of which is the same.

The advantages achieved by the increase of the boiling point due to the glycerol addition have already been pointed out hereinabove. A mixture of water and glycerol with 25%, by weight, of glycerol has a boiling point of 103° C. at a barometric pressure of 1 Bar. A 75%, by weight, aqueous glycerol solution has a boiling point of 117° C. at the same barometric pressure. The dissolution of buffering agents in said mixtures results in a further increase in the boiling points.

According to another embodiment of the present invention it has been found that regeneration of the absorption solution with hydrogen sulfide is preferably carried out at a higher temperature than that at which regeneration is effected in the above mentioned known processes. Temperatures between 90° C. and 120° C. are the preferred temperatures. To set free a sufficient concentration of hydratized sulfur dioxide from HSO$_3'$ is possible only by supplying addition heat energy. A sufficient concentration of hydratized SO$_2$, however, is the prerequisite for the reaction with hydrogen sulfide proceeding at a sufficient speed and without substantial side-reactions.

The boiling point of the solution is above the melting point of the sulfur if the glycerol concentration is at least 70%, by weight. Under these conditions the sulfur is collected in fluid form at the bottom of the regenerator and can be drained off therefrom. When proceeding in this manner, it is possible to avoid that the sulfur precipitates in finely divided form, especially during the initial stage of the regeneration process, and the it may enter side-reactions.

The process according to the present invention is substantially carried out as follows:

The waste gas to be purified is introduced into the absorption vessel filled with a glycerol-containing buffer solution. In general, any available buffer solution can be used. It is only essential that it contains glycerol. The advantages achieved by the process according to the present invention are observed already when only about 5% of glycerol are added. They become more and more pronounced with increased glycerol concentration. In general, a glycerol addition of between about 20% and about 80%, and preferably between about 20% and 70%, has proved to yield highly satisfactory results.

A packed column or tower in which absorption solution and waste gas are introduced, preferably countercurrently, is a preferred absorption apparatus.

In a preferred embodiment of the invention the solution is conducted to the sulfate separator after it has been charged with sulfur dioxide to a content of about 30% to about 35% and when it has attained a pH-value between about 3.0 and about 3.5. In said sulfate separator barium ions, preferably in the form of a barium sulfide solution of the preferred concentration of about 1 mole of barium sulfide per liter, and added to the solution charged with sulfur dioxide. The pH-value of the solution shall not increase above a pH-value of about 3.6 during sulfate precipitation; otherwise barium sulfite and also barium phosphate, respectively precipitate. If buffering agents are used which form difficulty soluble compounds with barium and if the pH-value of the charged buffer solution is above a pH of 3.6, it is advisable to wash the separated barium sulfate with sulfur dioxide-containing water as obtained, for instance, from the dust scrubber. In any event the wash water of the barium sulfate is recycled to the absorption solution.

The separated barium sulfate can be utilized as Blanc fixe, i.e. permanently white, depending upon its quality. Or it can be reduced by reaction with carbon to barium sulfide which can be recycled into the process.

The charged absorption solution can be regenerated either by driving off the sulfur dioxide by heating and collecting the driven off gas. Or the charged absorption solution is contacted with an excess of hydrogen sulfide, i.e. with an amount between about 50% and about 500% of the stoichiometric amount of sulfur dioxide present in the absorption solution. Since the reaction between sulfur dioxide and hydrogen sulfide proceeds rather slowly, it is advisable to use at least two successively arranged reactors so as to avoid losses of sulfur dioxide or, respectively, sulfur.

A possibility to accelerate the reaction between sulfur dioxide and hydrogen sulfide consists in using a solution of hydrogen sulfide in a suitable organic water-immiscible solvent in which hydrogen sulfide is soluble. Such solvents are, for instance, toluene, bromoform, chlorobenzene and 1,2-dibromo ethane. If the two solutions, i.e. the sulfur dioxide-containing absorption solution and the hydrogen sulfide-containing, water-immersible solvent solution, are intimately contacted with each other, for instance, in an extraction column, or in a mixer-separator battery, reaction between sulfur dioxide and hydrogen sulfide proceeds at a high speed. This process of carrying out the regeneration step has the advantage that it is not necessary to increase the temperature, that the excess of hydrogen sulfide can be kept relatively low and that duration of the reaction, i.e. the time of contact of the absorption solution with the hydrogen sulfide solution in the regenerator can be reduced without any disadvantage.

In all these instances the sulfur is obtained within the stated pH-range in an aggregated, well-filterable, and washable form. Washability of the sulfur can even be improved by the addition of wetting agents to the absorption solution. Of course, when selecting the wetting agents, care must be taken that the wetting agent does not form difficulty soluble compounds with barium ions.

The wash-water recovered from washing the sulfur is also fed into te absorption cycle.

After separating the sulfur and, if necessary, replenishing the buffer agent, the absorption solution is recycled into the absorption apparatus.

Precipitation of the sulfate in the form of barium sulfate from the absorption solution has considerable advantages over the known method described in German Published Application No. 2,250,959 in which the sulfate is separated as Glauber's salt, i.e. sodium sulfate decahydrate, by cooling the absorption solution to a temperature of 0° C. to 10° C. The separation of the barium sulfate does not require additional energy. In the known process considerable energy must be supplied when taking into consideration that absorption is carried out at temperatures up to about 93° C. Since formation of sulfate is in any case kept quite low by the addition of glycerol to the buffer solution according to the present invention, the required amount of barium ions to be added is also small, so that the economy of the process according to the present invention is further-more improved by precipitating the sulfate in this manner. In addition thereto, the resulting barium sulfate can directly be employed for further uses.

It is a further advantage of the process according to the invention that it is not necessary to add alkali metal hydroxide or carbonate or other basic compounds to the buffer solution because the pH value increases slowly during the $SO_2$ introduction due to the glycerol addition. Compared with the known processes using alkali metal salts as buffering agents in the process of the invention there is no consumption of alkali as no alkali metal sulfate must be removed from the solution.

For the purposes of the invention among others the following buffering agents may be used: sodium biphthalate; boric acid/sodium borate; borax/sodium biphthalate; citric acid/phosphoric acid/boric acid/sodium hydroxide (according to Theorell and Stenhagen). Suitable surface active agents are: the non ionics such as polyoxyalkylene oxides, ethoxylated alkylphenols and ethoxylated aliphatic alcohols, carboxylic esters and amides, anionic and cationic surfactants are suitable as well. If the sulfate ions in the reaction mixture are removed by the addition of $Ba^{2+}$ ions the surface active agent must not contain any group which reacts with barium.

The process of the invention is applicable to all waste gases containing very low concentrations of about 0.1% up to 15% $SO_2$ such as those emanating from a Claus furnace or derived from sulphur production plants or from the roasting of sulfide ores and others. They may also contain other gases such as nitrogen, carbon dioxide, carbon disulfide, carbon oxysulfide, sulfur vapour, oxygen in an amount up to 25% and hydrogen sulfide in an amount up to 1%, i.e. the $H_2S$ content should be considerably lower than the $SO_2$ content. This high amount of hydrogen sulfide may be tolerated because the degree of oxydation of the buffer solution is kept low by the glycerol addition so that the formation of thiosulfates and polythionates is nearly suppressed.

BRIEF DESCRIPTION OF THE PREFERRED EMBODIMENTS

The following examples serve to illustrate the present invention without, however, limiting the same thereto:

EXAMPLE 1 (not according to the invention)

According to this example an aqueous solution containing one mole of sodium sulfite according to the prior art is used for absorption of sulfur dioxide. When $SO_2$ is added to this solution the reactions according to equations (1) and (2) as noted above take place and thereby developing the buffer system of equation (3).

A gas mixture consisting of 2.8% of sulfur dioxide, 20.4% of oxygen, and 76.8% of nitrogen is passed through a vessel provided with stirrer and containing 2 liters of a molar aqueous solution of sodium sulfite with a current velocity of 180 liters per hour within four hours. The temperature of the solution is at about 70° C. After absorption, the degree of oxidation in the solution is 14%.

EXAMPLE 2

This example differs from Example 1 merely by using a glycerol-water mixture containing 25%, by weight, of glycerol for dissolving the sodium sulfite. Thus the absorption solution contains one mole/l. of sodium sulfite in water containing 25%, by weight, of glycerol. After absorption of the same gas mixture as in Example 1, namely a gas mixture containing 2.8% of sulfur dioxide, 20.4% of oxygen, and 76.8% of nitrogen, the same gas purifying effect is achieved as in Example 1 but the degree of oxidation is much lower, namely only 2.5%. It is evident that glycerol addition to the aqueous sodium sulfite solution very considerably reduces the formation of sulfate.

EXAMPLE 3 (not according to the invention)

According to the prior art 2 liters of an aqueous solution of a phosphate buffer which contains 0.5 moles/l. of disodium phosphate and 0.5 moles/l. of monosodium phosphate. Said phosphate buffer solution was contacted in the absorption vessel provided with stirrer as used in Example 1 with the gas mixture containing 2.8% of sulfur dioxide, 20.4% of oxygen, and 76.8% of nitrogen with a current velocity of 180 liters per hour during 276 minutes. The temperature of the solution during absorption was at about 70° C. The degree of oxidation after absorption was at 8.5%.

For regeneration, the absorption solution with a sulfur dioxide charge of 30% was reacted in the same vessel provided with a stirrer at 90° C. with a stream of gaseous hydrogen sulfide at a current velocity of 10 liters per hour. In order to recover any escaping sulfur, a second empty vessel was arranged following the regeneration vessel. The amount of hydrogen sulfide introduced into the absorption solution amounted to six times the stoichiometric amount required for the amount of sulfur dioxide contained into the absorption solution.

The precipitated sulfur could readily be separated by filtration from the solution. The total sulfur yield including the yield recovered in the subsequently arranged second vessel was about 80%.

EXAMPLE 4

Example 3 was repeated with the only difference that the phosphates were dissolved in a water-glycerol mixture containing 25%, by weight, of glycerol. Furthermore, the absorption solution contained 0.1% tributyl phenol poyglycol either as a nonionic surface active agent. After absorption, the degree of oxidation amounted to 0.4%.

On regeneration by means of hydrogen sulfide, the temperature during the first half of the regeneration step was kept at 95° C. and during the second half thereof at 100° C. The precipitated sulfur could readily be separated from the solution by filtration. Due to the presence of a surface active agent in the absorption solution washing of the sulfur was considerably improved. The yield of sulfur amounted to 89%.

When the regeneration is repeated without the addition of a surface active agent the separation of the precipitated sulfur is difficult in that the settling of the sulfur in the reaction vessel is not complete and the washing step of the sulfur requires a far greater amount of water.

When comparing Examples 3 and 4, it is evident that the addition of glycerol considerably decreases the degree of oxidation also when using a phosphate buffer as absorbing agent. Furthermore, the yield of sulfur is markedly increased or regeneration.

EXAMPLE 5

The apparatus consisted of three successively arranged vessels provided with stirrers. Two liters of a solution which contained 0.5 moles/l. of disodium phosphate and 0.5 moles/l. of monosodium phosphate in a glycerol-water mixture containing 25% of glycerol were placed into each vessel. The solution contained also 0.1% of a nonionic surface active agent dissolved therein.

The solution in vessel I was pre-charged to 16% with sulfur dioxide before this experiment was started. The gas to be purified had the composition described in Example 1, namely 2.8% of sulfur dioxide, 20.4% of oxygen, and 76.8% of nitrogen. Said gas was conducted through the vessels I, II and III with a velocity of 180 l./h. After 260 minutes the charge in vessel I amounted to 32%, in vessel II to 16%, and in vessel III to 0.3%. The residual content of sulfur dioxide in the gas which passed out of vessel III amounted to 10 ppm.

Thereafter, hydrogen sulfide was introduced into vessel I as described in Example 3. The precipitated sulfur could readily be connected by filtration. The yield of sulfur mounted to 90%.

Regeneration was effected in the same manner with the contents of vessel II. The yield of sulfur amounted to 71%.

This high yield is possible due to the high sulfur dioxide charge of the absorption solution and such a high sulfur dioxide charge in turn is achieved by the addition of glycerol. The high yield of sulfur is an important factor with respect to the economy of the process.

EXAMPLE 6

Into the absorption solution regenerated according to Example 4 there was again introduced waste gas up to a sulfur dioxide charge of 30%. The pH-value amounted thereafter to a pH of 3.0. The degree of oxidation of the solution was at 1.6% after such successive absorption, regeneration, and again absorption procedures. This corresponds to an $SO_4''$ amount of 57.6 millimoles in the solution.

In order to remove the sulfate, 60 ml. of a solution which contained 165.7 g. of barium sulfide per liter were added to the absorption solution charged with sulfur dioxide. The absorption solution had a pH-value of 3.3 after such addition. The precipitated barium sulfate was filtered off and was covered with a few ml. of sulfur dioxide-containing water as obtained from the gas scrubbing process. 13 g. of barium sulfate containing 2% of sulfur dioxide an only traces of phosphorus pentoxide were obtained thereby.

EXAMPLE 7

Two liters of a solution containing 0.5 moles/l. of disodium phospate and 0.5 moles/l. of monosodium phosphate were placed into a vessel which was conically tapered at its bottom. The buffering solution consisted of a water-glycerol mixture with 70%, by weight, of glycerol.

Absorption proceeded as described in Example 3. The degree of oxidation after absorption was at 0.3%.

Regeneration was also carried out as described in Example 3 with the only difference that about 30 minutes after the treatment with hydrogen sulfide had started, the temperature was increased from 95° C. to 116° C. and the reaction mixture was kept at said temperatures. The degree of oxidation after regeneration was 1.24%.

Most of the sulfur was collected in molten form at the lowest part of the conical bottom of the absorption and regeneration vessel and was discharged from time to time. The yield of sulfur amounted to 88%.

Of course, other buffering agents, other amounts of glycerol, and other wetting agents than those mentioned in the preceding examples may be used likewise and the current velocity of the gas introduced into the absorption vessels as well as the amounts of hydrogen sulfide and barium sulfide or other barium salts used according to the present invention as well as other changes and variations may be made by those skilled in the art in accordance with the principles set forth herein and in the claims annexed hereto.

We claim:

1. In a process for removing sulfur dioxide from waste gases including introducing waste gases containing sulfur dioxide into a buffer solution capable of absorbing sulfur dioxide, and passing said waste gas through said buffer solution at a controlled pH to effect absorption of SO$_2$, the improvement which comprises using a buffer solution containing glycerol in a amount between about 20% to about 70% of the solution for sulfur dioxide absorption from the waste gases.

2. The process of claim 1, in which the waste gases contain up to 25% of oxygen.

3. The process of claim 1, in which the waste gases contain hydrogen sulfide.

4. The process of claim 1, in which the waste gases contain hydrogen sulfide and up to 25% of oxygen.

5. The process of claim 1, comprising the additional steps of
   (a) reacting the sulfur dioxide absorbed in the glycerol-containing buffer solution with hyddrogen sulfide dissolved in an organic solvent so as to precipitate sulfur and
   (b) separating the precipitated sulfur from the reaction mixture.

6. The process of claim 1, comprising the additional steps of
   (a) introducing gaseous hydrogen sulfide at a temperature of at least 90° C. into the glycerol-containing buffer solution having absorbed therein sulfur dioxide so as to precipitate sulfur and
   (b) separating the precipitated sulfur from the glycerol-containing buffer solution.

7. The process of claim 6, in which in step (a) reaction with gaseous hydrogen sulfide is carried out at the molten temperature of sulfur and in step (b) the molten sulfur is separated from the glycerol-containing buffer solution.

8. The process of claim 6, in which in step (a) reaction with gaseous hydrogen sulfide is carried out at a temperature below the melting point of sulfur in the presence of a surface active agent.

9. The process of claim 1, in which barium ions are added to the glycerol-containing buffer solution having sulfur dioxide absorbed therein, the pH-value of said sulfur dioxide-charged glycerol buffer solution not exceeding a pH of 3.6, so as to remove any sulfate ions present in said solution.

10. The process of claim 7, in which barium ions are added to the glycerol-containing buffer solution having sulfur dioxide absorbed therein, the pH-value of said sulfur dioxide-charged glycerol-buffer solution not exceeding a pH of 3.6, removing the precipitated barium sulfate, and subjecting the resulting sulfate ion-free solution to the sulfur recovering steps of claim 7.

11. The process of claim 4, in which barium ions are added to the glycerol-containing buffer solution having sulfur dioxide absorbed therein, the pH-value of said sulfur dioxide-charged glycerol-buffer solution not exceeding a pH of 3.6, removing the precipitated barium sulfate and subjecting the resulting sulfate ion-free solution to the sulfur recovering steps of
   (a) introducing gaseous hydrogen sulfide at a temperature of at least 90° C. into the glycerol-containing buffer solution having absorbed therein sulfur dioxide so as to precipitate sulfur and
   (b) separating the precipitated sulfur from the glycerol-containing buffer solution.

12. The process of claim 9, in which the barium ions are added in the form of a barium sulfide solution to the glycerol-containing buffer solution having sulfur dioxide absorbed therein.

13. The process of claim 10, in which the barium ions are added in the form of a barium sulfide solution to the glycerol-containing buffer solution having sulfur dioxide absorbed therein.

14. The process of claim 11, in which the barium ions are added in the form of a barium sulfide solution to the glycerol-containing buffer solution having sulfur dioxide absorbed therein.

* * * * *